(12) United States Patent
Davison et al.

(10) Patent No.: US 7,302,979 B2
(45) Date of Patent: Dec. 4, 2007

(54) VEHICLE TIRE INFLATION SYSTEM AND SENSOR AND METHOD OF USE

(75) Inventors: Kent E. Davison, Sturgis, MI (US); David G. Moses, Kalamazoo, MI (US); Daryl J. Stacer, Portage, MI (US)

(73) Assignee: Dana Corporation, Toledo, OH (US)

( * ) Notice: Subject to any disclaimer, the term of this patent is extended or adjusted under 35 U.S.C. 154(b) by 343 days.

(21) Appl. No.: 11/081,228

(22) Filed: Mar. 16, 2005

(65) Prior Publication Data
US 2006/0207705 A1 Sep. 21, 2006

(51) Int. Cl.
*B60C 23/00* (2006.01)
*G01P 15/00* (2006.01)

(52) U.S. Cl. .......................................... 152/417; 73/488

(58) Field of Classification Search ........ 152/415–417; 301/105.1, 131, 132
See application file for complete search history.

(56) References Cited

U.S. PATENT DOCUMENTS

| | | | | |
|---|---|---|---|---|
| 4,027,753 | A | * | 6/1977 | Lantz .................... 188/181 R |
| 4,282,949 | A | * | 8/1981 | Kopich et al. ............. 180/252 |
| 4,844,138 | A | | 7/1989 | Kokubu |
| 5,287,906 | A | | 2/1994 | Stech |
| 5,327,346 | A | | 7/1994 | Goodell |
| 5,487,005 | A | | 1/1996 | Genise |
| 6,064,936 | A | | 5/2000 | Nakajima |
| 6,278,361 | B1 | | 8/2001 | Magiawala et al. |
| 6,283,186 | B1 | * | 9/2001 | Krisher .................... 152/417 |
| 6,313,742 | B1 | | 11/2001 | Larson |
| 6,315,457 | B1 | | 11/2001 | Kapaan et al. |
| 6,384,720 | B1 | | 5/2002 | Juzswik et al. |
| 6,435,238 | B1 | | 8/2002 | Hennig |
| 6,553,290 | B1 | | 4/2003 | Pillar |
| 6,575,269 | B1 | | 6/2003 | Skoff et al. |
| 6,585,019 | B1 | | 7/2003 | Ingram |
| 6,668,888 | B1 | | 12/2003 | Beesley et al. |
| 2001/0052258 | A1 | * | 12/2001 | Ehrlich et al. ............ 73/118.1 |
| 2003/0152302 | A1 | | 8/2003 | Chinitz et al. |

FOREIGN PATENT DOCUMENTS

EP 1 099 574 A1 5/2001

OTHER PUBLICATIONS

Wabash National, MBS-2 Installation Guide, Website page, Aug. 2002, http://www.wabashnational.com/pdgs/MBS-2.pdf.

* cited by examiner

*Primary Examiner*—Jason R. Bellinger
(74) *Attorney, Agent, or Firm*—Marshall & Melhorn LLC

(57) ABSTRACT

A combined tire inflation system and a wheel speed sensor for a vehicle steer axle has a steerable spindle with a substantially hollow interior portion. A shaft, located in the hollow interior portion, connects a rotatable hub cap adjacent the spindle and a sensor at least partially within the spindle. A magnet is secured to the shaft and rotates with the shaft. A sensor is mounted adjacent the magnet for sensing the rotation of the magnet. The shaft has a hollow interior that connects an air source with a tire associated with the hub cap.

19 Claims, 3 Drawing Sheets

VEHICLE TIRE INFLATION SYSTEM AND SENSOR AND METHOD OF USE

FIELD OF THE INVENTION

The present invention relates to a vehicle tire inflation system and sensor and method of use. More particularly, the present invention relates to a vehicle tire inflation system combined with an ABS wheel speed sensor for a steering axle.

BACKGROUND OF THE INVENTION

Various tire inflation systems for vehicles are well known to those skilled in the art. Wheel speed sensors to detect the wheel speed for various purposes, such the ABS system of the vehicle, are also well known, It is not generally well known, however, to combine a tire inflation system with a wheel speed sensor for a steering axle.

For example, U.S. Pat. No. 5,287,906 teaches an air delivery system for vehicles. The patent only generally states that the system can be used for the front axle of a vehicle. In the embodiment of the invention depicted and described in the patent, the system comprises a fixed axle having a fixed air line extending therethrough. The fixed air line is connected to a rotatable joint. The rotatable joint is located in the wheel hub of a wheel. The joint rotates with respect to the fixed air line and it transmits air from the line to a tee. The tee is located outside of the hub. Various air lines extend from the tee to the tires of the vehicle. The patent is silent regarding the use of wheel speed sensor.

U.S. Pat. No. 6,668,888 provides for a tire inflation system for a live spindle wheel assembly of a front drive/steering axle. The wheel assembly comprises a steering knuckle that supports a spindle assembly on a plurality of bearings. An inlet air passageway extends through the body portion of the steering knuckle at an angle to the axle. The inlet air passageway is in fluid communication with an air pressure chamber in the spindle assembly. A hub cap encloses the air pressure chamber within the spindle assembly except for a central aperture in the hub cap. The central aperture allows air to communicate from the chamber to the interior of a pneumatic tire. A drive shaft, located within the steering knuckle and the spindle assembly, is engaged with the spindle assembly for providing drive to the tire associated with the spindle assembly. The patent is silent regarding a wheel speed sensor.

U.S. Pat. No. 5,327,346 provides for a central tire inflation system for an all wheel drive vehicle. The system includes wheel speed sensors consisting of slotted discs attached to the wheel hubs of the vehicle. Data from the wheel speed sensors is sent to a computer that controls the tire inflation pressure of each tire. The inflation pressure can be raised or lowered if the wheel exceeds or drops below a pre-determined speed or if the wheel slips.

The prior art briefly discussed above suffer from various disadvantages. The most obvious disadvantage of U.S. Pat. Nos. 5,287,906 and 6,668,888 is that both lack a sensor. Additionally, the design described and depicted in U.S. Pat. No. No. 5,327,346 does not efficiently package both a tire inflation system and a sensor so that valuable area at the wheel end is wasted.

In light of the various disadvantages of the prior art discussed above, it would be advantageous to have a wheel end design that compactly incorporated a tire inflation system and a sensor, such as for the ABS system, for the steering axle of a vehicle.

SUMMARY OF THE INVENTION

The present invention is directed toward a combined sensing unit and fluid conduit system associated with a steerable spindle for a vehicle. The system is preferably mounted at least partially within an inboard end of the spindle. The spindle has a hollow interior portion connecting the system with a hub cap mounted adjacent the spindle. Preferably, a hollow drive shaft is located in the hollow interior portion of the spindle. The hollow drive shaft is connected for rotation with the hub cap. Air may be passed through the drive shaft to one or more tires associated with the hub cap.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
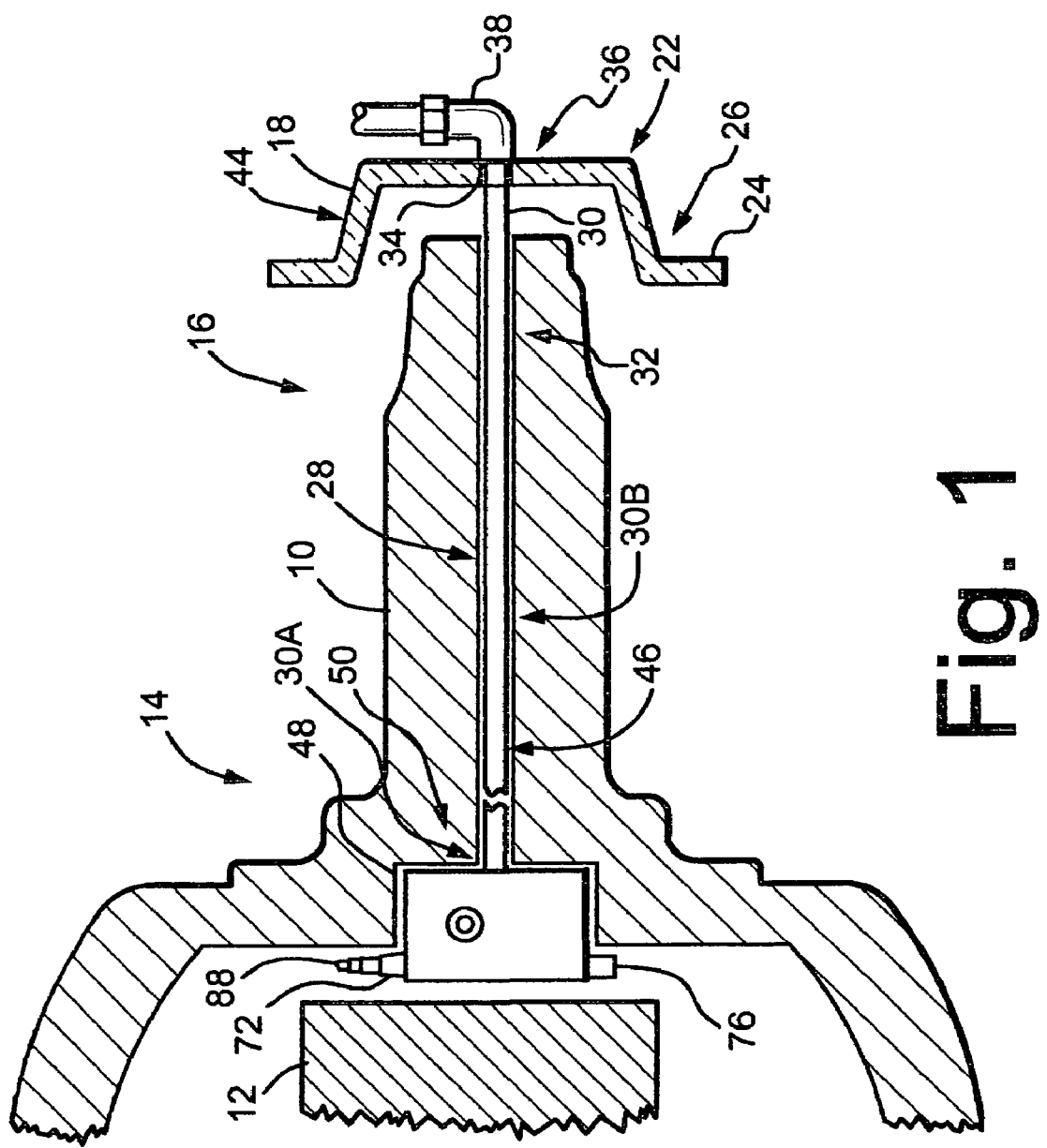
FIG. 1 is a schematic, cut away side view of a preferred embodiment of the present invention depicting a spindle, a hub cap and a sensor system.

Referring now to FIG. 1, a spindle 10 associated with a steering axle 12 of a vehicle is schematically depicted. Only a portion of the steering axle 12 is depicted as the present invention is not limited to any particular steering axle and any steering axle may be used without departing from the scope of the present invention.

The spindle 10 may be connected to the axle 12 by any structure known to those skilled in the art including, but not limited to, locating a king pin through a knuckle associated with the spindle and also through the axle. One or more control arms and/or steer arms may also be connected to the knuckle and/or the spindle 10 to move the spindle 10 fore and aft to turn one or more wheels associated with the spindle 10.

Those skilled in the art will appreciate that the spindle 10 is commonly joined with the knuckle. A knuckle assembly, inclusive of the spindle 10, may be, by way of example only, such as a Dana Left Hand Knuckle Assembly part number 972171 or a Dana Right Hand Knuckle Assembly part number 972173 available from Dana Corporation of Toledo, Ohio.

By way of example only, the steering axle may be such as part number 1202TB104-5 available from Dana Corporation of Toledo, Ohio.

Figure 2:
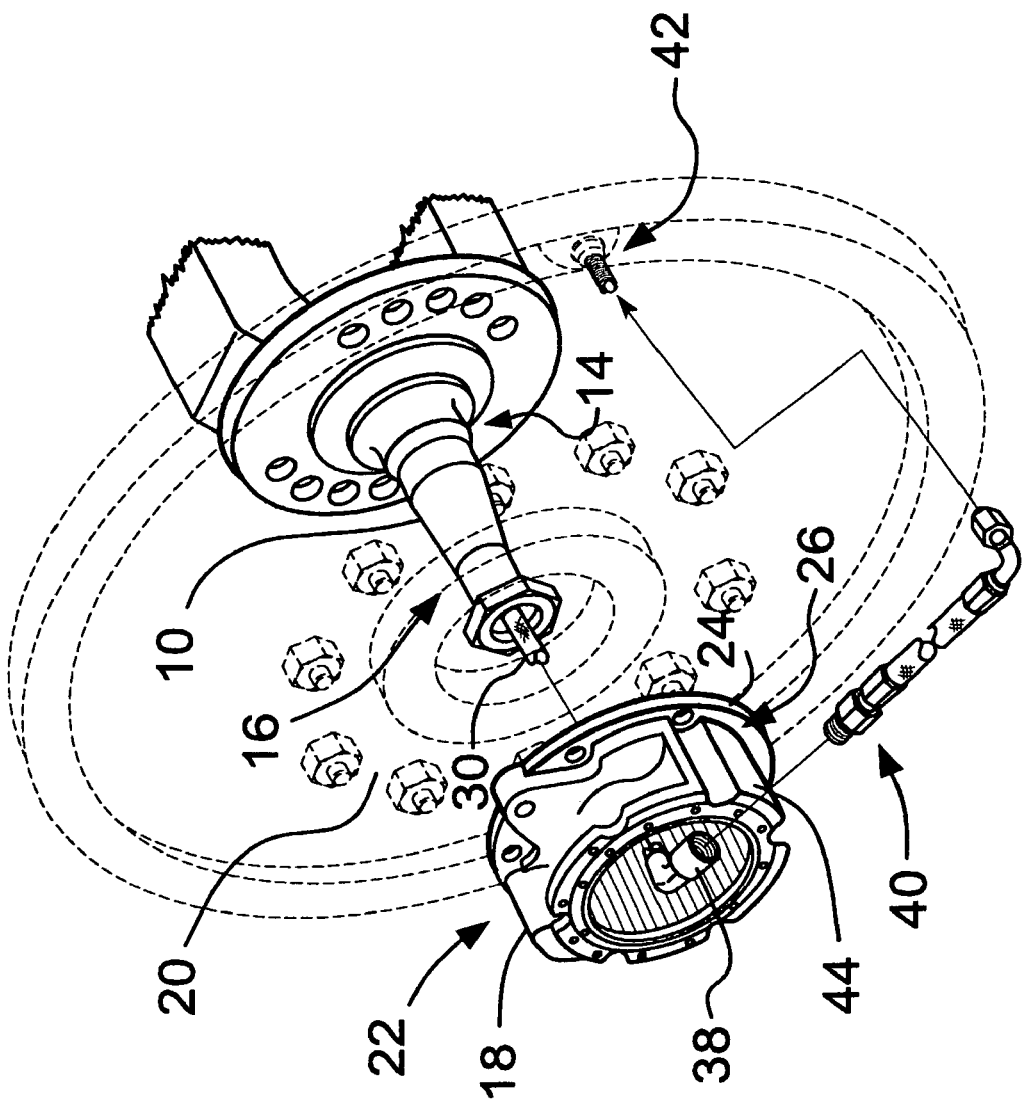
FIG. 2 is a perspective view of preferred embodiments of the spindle and the hub cap of the present invention.

Preferably, the spindle 10 has an inboard portion 14 and an outboard portion 16. In the preferred embodiment depicted in FIG. 1, at least one hub cap 18 is located adjacent the outboard portion 16 of the spindle 10. Those skilled in the art will appreciate that the hub cap 18 is mounted within, or to, a wheel 20, as shown in FIG. 2. The wheel 20 supports one or more tires (not shown) thereon. As the tire travels over the ground, it rotates the wheel 20 and the hub cap 18. By way of example only, the wheel 20 may be such as part number 2536, available from the Webb Company of Cullman, Ala.

The hub cap 18 may be of any design known to those skilled in the art. By way of example only, the hub cap 18 may be such as part number 673526, available from Dana Corporation of Toledo, Ohio. Preferably, the hub cap 18 has a hat-shaped portion 22 and a circular flange 24 extending radially from a base 26 of the hat-shaped portion 22.

It should be appreciated, however, that a solid hub cap, such as part number 97081, available from Dana Corporation of Toledo, Ohio, may also be used. An aperture, as described in more detail below, will have to be located in the solid hub cap, such as by drilling, for use in the present invention.

As shown in FIG. 1, at least a portion of the hub cap 18 radially overlaps the outboard portion 16 of the spindle 10. Those skilled in the art will appreciate that the hub cap 18 need not overlap the spindle 10 for the present invention.

A preferred embodiment of the spindle 10 includes a hollow interior portion 28 extending from the inboard portion 14 to the outboard portion 16 of the spindle 10. Preferably, the hollow interior portion 28 is located substantially centrally through the spindle 10. The hollow interior portion 28 may be any shape or size, however, it is preferred that the hollow interior portion 28 be substantially tubular.

Figure 3:
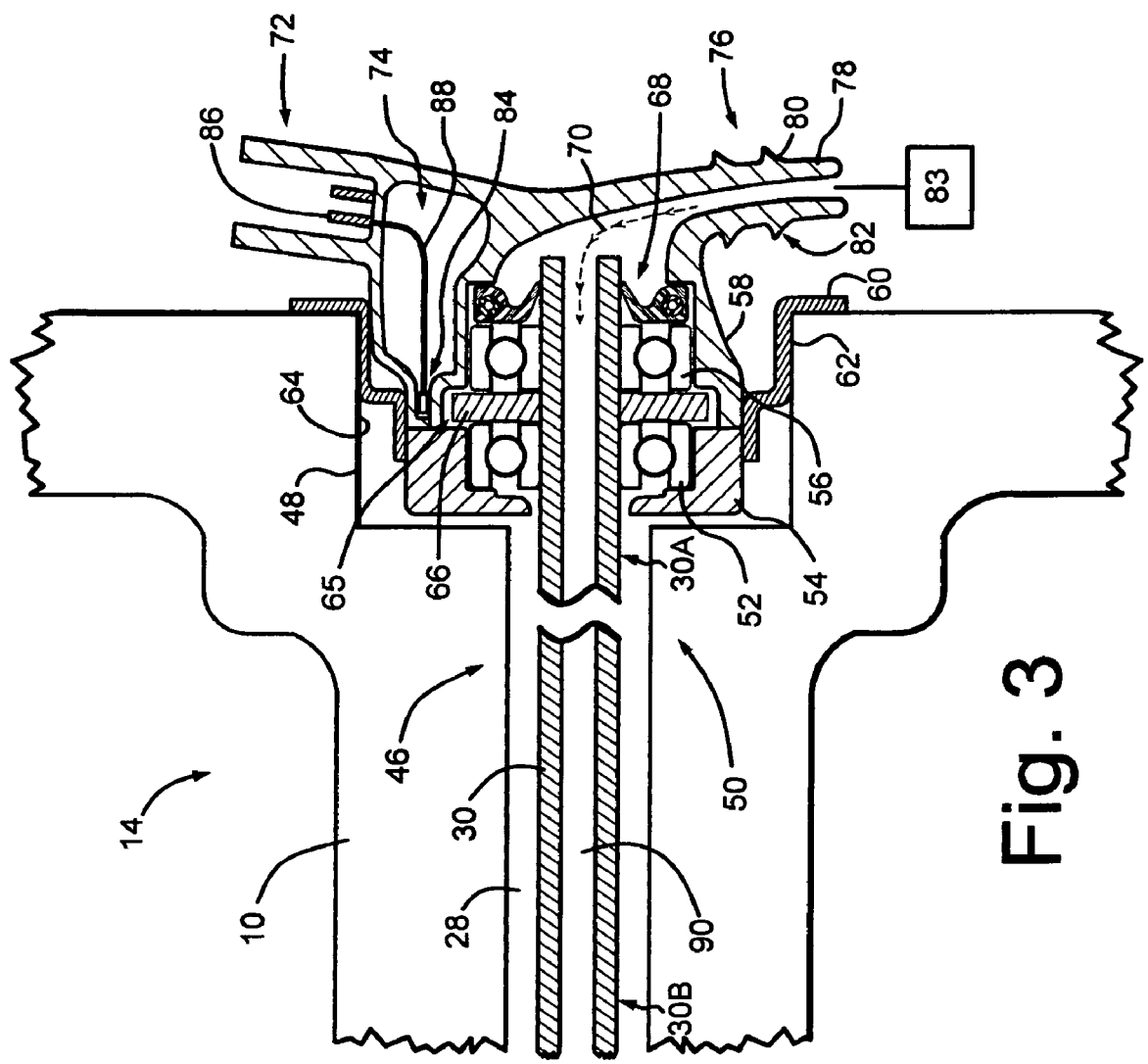
FIG. 3 is a partial, schematic, cut away side view of a preferred embodiment of the spindle and sensor system of the present invention.

Preferably, a shaft 30 is located within the hollow interior portion 28 of the spindle 10. The shaft 30 may be hollow or solid and the shaft 30 may be rigid, semi-rigid or flexible. The shaft 30 is preferable a single piece, however, it may be comprised of multiple pieces joined together, as shown in FIGS. 1 and 3. By way of example only, the shaft 30 may have an inboard first portion 30A and an outboard second portion 30B. The first portion 30A and the second portion 30B may be joined by a friction fit, adhesive, mechanical fasteners and/or threads in addition to any means known to those skilled in the art.

As shown in FIG. 1, the shaft 30 preferably has a first portion 32 that is connected to the hub cap 18. Preferably, the first portion 32 extends through an aperture 34 in the hub cap 18. As shown in FIG. 1, the aperture 34 is preferably located through a central portion 36 of the hub cap 18. The first portion 32 is preferably connected to an elbow fitting 38. The fitting 38 is releasably secured to one or more connectors 40 that connect the elbow fitting 38 with a tire air feed 42, as shown in FIG. 2. Alternatively, the first portion 32 itself may be bent (not shown) outboard from the hub cap 18 to connect with the connectors 40.

In yet another embodiment, the aperture (not shown) may be located through a side portion 44 of the hub cap 18. In this embodiment, the first portion 32 of the shaft 30 is preferably bent approximately 90° within the hub cap 18. The shaft 30 is then located through the aperture 34 in the side portion of the hub cap 18. The first portion 32 of the hub cap 18 may then be connected to the tire air feed 42 as described above.

Those skilled in the art will appreciate that the apertures described above may be drilled or cast with the hub cap 18. The present invention is not limited to any method or means for locating the apertures in the hub cap 18.

The first portion 32 of the shaft 30 may be connected to the hub cap 18 by a friction fitting, threads, adhesive and/or one or more mechanical fasteners. Regardless of the method used, it is preferred that the first portion 32 of the shaft 30 be adequately secured to the hub cap 18 so that as the hub cap 18 rotates, it simultaneously rotates the shaft 30.

A second portion 46 of the shaft 30 extends to a recess 48 located in the inboard end 14 of the spindle 10. Preferably, the second portion 46 of the shaft 30 extends into a combined sensing unit and fluid conduit system 50 at least partially located in the recess 48.

The shaft 30 is mounted for rotation within the system 50 preferably with at least one friction reducing device. The friction reducing device may be one or more bearings. Those skilled in the art will appreciate that the bearings may be such as bushings, ball bearings, needle bearings or tapered bearings. In the preferred embodiment depicted in FIG. 3, a first bearing 52 is preferably seated in a front cover 54 and a second bearing 56 is preferably seated in a back cover 58.

The front cover 54 and/or the back cover 58 are connected to a member used to position the covers 54, 58 within the recess 48. The member may be constructed of any material. For example, the member may be constructed of plastic formed by molding. In a preferred embodiment, the member is constructed of metal and is formed by stamping.

As shown in FIG. 3, the front cover 54 and/or the back cover 58 are connected to a stamping 60. The covers 54, 58 may be integrally formed with the stamping 60, the stamping 60 may be overmolded into the covers 54, 58 and/or the stamping 60 may be otherwise secured to the covers 54, 58 by any means known to those skilled in the art, such a frictional engagement, mechanical fasteners, heat staking, interlocking structures, and/or adhesive. An outer surface 62 of the stamping 60 preferably has a locking means (not shown) for engagement with an inside surface 64 of the recess 48. The locking means may be, but is not limited to, teeth, ridges, threads, adhesive and/or mechanical catches designed to releasably secure the stamping 60 to the spindle 10. Preferably, the stamping 60 is located within the recess 48 with an interference or frictional fit.

An angular velocity system 65, part of the combined sensing unit and fluid conduit system 50, is secured to the shaft 30 for rotation therewith. The angular velocity system 65 may be magnetic or optical. If the system 65 is optical, it may be comprised of a toothed ring mounted on the shaft. A light source shines through the teeth to a sensor. The light from the light source may be visible light or non-visible light. The rotational velocity of the shaft 30 can be determined by the pulses of light captured by the sensor from the teeth passing in front of the light.

In the preferred embodiment depicted in the figures, the system 65 is magnetic and comprises a magnet 66, such as a multi-pole magnet, located on the shaft 30 for rotation therewith. As shown in FIG. 3, the magnet 66 is preferably located on the shaft 30 between the first bearing 52 and the second bearing 56. It should be appreciated, however, that the present invention is not limited to locating the magnet 66 between the bearings 52, 56. Instead, the magnet 66 may be located anywhere along the second portion 46 of the shaft 30 as the bearings 52, 56 cause the entire shaft 30 to rotate in a very precise position. However, locating the angular velocity system 65, whether it is optical or magnetic, between the two bearings 52, 56 is preferred.

Preferably, a rotary seal 68 is located about the second portion 46 of the shaft 30. The rotary seal 68 is preferably secured to the back cover 58, as shown in FIG. 3. The seal 68 is designed to contact the shaft 30 yet permit free rotation of the shaft 30. The seal 68 prevents air, as described in more detail below, from escaping between the shaft 30 and the back cover 58. The seal 68 also prevents air from escaping between the seal 68 and the shaft 30. The seal 68 also prevents dirt and debris from infiltrating into an air passageway 70. Those skilled in the art will appreciate that a rotating seal, secured to the shaft 30, is also within the scope of the present invention.

The back cover 58 is a single piece construction, although it is within the scope of the invention to construct the back cover 58 from more than one piece. The back cover 58 preferably comprises a connector surround 72, an electronics cavity 74 and an air line connection 76.

The air line connection 76 has a hollow, downwardly extending portion 78. As shown in FIGS. 1 and 3, the downwardly extending portion 78 is substantially orthogonal to the shaft 30 to avoid contact with the axle 12.

The air line connection 76 is in no way limited to the portion 78 that extends downwardly. The air line connection 76 may extend in any radial or axial direction and any such embodiment is within the scope of the present invention.

An exterior surface 80 of the air line connection 76 preferably has a fitting 82 comprised of one or more barbs, a set of threads and/or a series of alternating ridges and grooves. It is also within the scope of the present invention for the fitting 82 to be a push-to-connect fitting known to those skilled in the art. The fitting 82 is designed to securely receive an air line (not shown) from a source of air 83.

The source of air 83 may be such as an air compressor or one or more air reservoirs located on the vehicle. The air line connection 76 provides a connection to the source of air 83 and minimizes the space required for the connection.

Those skilled in the art will appreciate that if the shaft 30 is solid, the shaft 30 will not be connected to the source of air 83.

The electronic cavity 74 houses a sensor 84 adjacent the magnet 66. In a preferred embodiment, the sensor 84 is a wheel speed sensor designed to determine the rotations of the shaft 30 by the number of times the poles of the multi-pole magnet 66 pass by.

Preferably, the sensor 84 can detect forward and reverse rotation of the shaft 30. This detection is called quadrature, as known to those skilled in the art, and it may be used for magnetic systems as well as optical systems.

The sensor 84 may have two sensing elements in it or the sensor 84 may be comprised of two physically separate sensing elements. Regardless of the physical embodiment of the sensor 84, the sensing elements are offset from one another. The offset nature of the sensing elements results in the sensing elements first picking up a first portion of the angular velocity system 65, such as a magnetic transition from north to south of the magnet 66, and then a second portion of the angular velocity system 65, such as a magnetic transition from south to north of the magnet 66. By determining whether the first portion or the second portion passed by the sensing elements, it can be established if the shaft 30 was rotating in a direction considered to be forward for the vehicle or reverse.

A sensor 84, capable of determining rotation but not providing an indication of direction, may also be used in the present invention. In this case, only a single sensing element is needed and quadrature is not used.

The sensor 84 is electrically connected to a connector pin 86 located within the connector surround 72. The electrical connection is schematically depicted in FIG. 3 by a cable 88. It is within the scope of the present invention to connect the sensor 84 directly to the connector pin 86 or to have the sensor 84 connected to various electronics which are then connected to the connector pin 86.

The connector pin may have a two-prong connection or a three-prong connection. A two-prong design includes a prong for ground and another prong for both power and a signal. A two-prong is depicted in FIG. 3. It is also within the scope of the present invention to use the three-prong design wherein one prong is for power, another prong is for ground and the third prong is for a signal.

A plug (not shown), having a complementary shape to the connector pin 86 and the connector surround 72, is located in the connector surround 72. The plug is electrically connected to an electronic control unit (not shown) mounted on or in the vehicle. The electronic control unit may use the sensed information to calculate wheel speed for an anti-lock braking system, suspension performance, wheel spin and/or vehicle controllability data.

It is well within the scope of the present invention to include one or more accelerometers (not shown), or a temperature sensor (not shown) and/or one or more additional sensors within the electronics cavity 74.

Preferably, the connector pin 86 and the connector surround 72 extend in a substantial orthogonal direction to the shaft 30. As shown in FIGS. 1 and 3, the connector pin 86 and connector surround 72 extend in a substantially opposite direction to the downwardly extending portion of the air line connection 76. Directing the connector pin 86 and connector surround 72 in a substantially orthogonal direction from the shaft 30, allows the cable 88 connected to the connector pin 86 to avoid the end of the axle 12 and minimizes the space required for this connection.

Those skilled in the art will appreciate that the connector pin 86 and the connector surround 72 may extend in any direction with respect to the shaft 30 and/or the air line connection 76 without departing from the scope of the present invention. By way of example only, the connector surround 72 and the air line connection 76 may be radially adjacent one another. By way of yet another example, the positions of the connector surround 72 and the air line connection 76 may be switched from the embodiment depicted in FIG. 3.

In the preferred embodiment of the present invention, the shaft 30 has a substantially hollow interior portion 90 from the first portion 32 to the second portion 42. As shown in FIG. 1, the hollow interior portion 90 of the first portion 32 of the shaft 30 is in communication with the hollow elbow 38 described above. As best seen in FIGS. 1 and 3, the hollow interior portion 90 of the second portion 42 of the shaft 30 is in communication with the hollow air line connection 76 of the back cover 58 via the air passageway 70.

A preferred method of using the present invention comprises connecting the air line to the air line connection 76 and connecting the plug with the connector pin 86 in the connector surround 72. The system 50 is then secured within the stamping 60 as described above. Of course, if the system 50 is integrally formed with the stamping 60, this step can be avoided. The system 50 and the stamping 60 are then inserted into the recess 48 of the spindle 10. The locking means on the stamping 60 and the recess 48 are engaged with one another. As stated previously, this may be by engaging teeth, ridges, threads and/or an adhesive or by frictionally fitting the stamping 60 within the recess 48.

Preferably, the shaft 30 is located within the hollow interior portion 28 of the spindle 10 as the system 50 is located in the recess 48 of the spindle 10. The first portion 32 of the shaft 30 is located through the aperture 34 in the hub cap 18 and secured to the connectors 40 described above to connect the shaft 30 with the tire air feed 42.

Those skilled in the art will appreciate that the rotation of the tire associated with the wheel 20 connected to the hub cap 18 causes the hub cap 18 to rotate. Rotation of the hub cap 18 rotates the shaft 30 connected thereto. As provided above, the shaft 30 is rotatably mounted on the bearings 52, 56 within the system 50. The bearings 52, 56 facilitate the accurate rotation of the shaft 30 and allow the shaft 30 to rotate in a precise location within the system 50. The accurate rotation of the shaft 30 and the precise location of the shaft 30 allows the magnet 66 on the shaft 30 to accurately rotate in a specific location.

The accurate rotation of the magnet 66 in a specific location allows the speed sensor 84 to accurately sense the rotation of the magnet 66. The accurate sensed rotation of the magnet 66 is highly reliable information that can be sent to the vehicle electronic control unit for processing, as provided above.

Air from the air source flows from the air line, through the air line connection 76 and into the air passageway 70 of the back cover 58. The seal 68 prevents the air from escaping along the shaft 30. The air flows through the hollow interior 90 of the shaft 30 to one or more tires. The air source may continually pressurize the system 50 or air pressure may be provided on an intermittent basis.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A steering axle of a vehicle, comprising:
   a steerable spindle having an inboard portion and an outboard portion, said spindle having a hollow interior portion extending from said inboard portion to said outboard portion;
   a hub cap positioned adjacent said outboard portion of said spindle;
   a hollow shaft rotatably mounted within said hollow interior portion of said spindle wherein a first portion of said shaft is attached to said hub cap for rotation therewith; and
   a combined sensing unit and fluid conduit system mounted at least partially within said inboard portion of said spindle, said system connected to a second portion of said shaft, said second portion of said shaft also connected to an air supply.

2. The steering axle of claim 1, wherein said first portion of said shaft is connected to a tire air feed.

3. The steering axle of claim 1, wherein said spindle has a recess at said inboard portion, and wherein said recess is connected to said hollow interior portion of said spindle and said system is mounted within said recess.

4. The steering axle of claim 1, wherein said hub cap has an aperture therethrough for receiving said first portion of said shaft.

5. The steering axle of claim 1, wherein said hollow interior portion of said spindle is centrally located through said spindle.

6. The steering axle of claim 1, wherein said shaft has a substantially continuous interior portion for air to travel from said inboard portion of said spindle through said hub cap.

7. The steering axle of claim 1, wherein a magnet is secured to said shaft for rotation therewith within said system.

8. The steering axle of claim 1, wherein said shaft is rotatingly supported within said system by at least one bearing.

9. The steering axle of claim 8, wherein a rotary seal is located about said shaft and in sealingly engagement therewith.

10. The steering axle of claim 7, wherein said system has at least one non-rotating sensor located adjacent said magnet.

11. The steering axle of claim 10, wherein said sensor is located within a back cover.

12. The steering axle of claim 11, wherein said back cover defines an electronics cavity, a connector surround and an air line connection.

13. The steering axle of claim 9, wherein said magnet on said shaft is bounded by a first bearing and a second bearing and wherein said seal is located inboard of said second bearing.

14. A steering axle of a vehicle, comprising:
    a steerable spindle having an inboard portion and an outboard portion, said spindle having a central, hollow interior portion;
    a rotatable hub cap positioned adjacent said outboard portion of said spindle;
    a substantially hollow shaft located within said interior portion of said spindle and connected to said hub cap for rotation therewith;
    a combined sensing unit and fluid conduit system at least partially mounted within said interior portion of said spindle, said system comprising a speed sensor mounted within said spindle, said speed sensor comprising a magnet mounted for rotation on said shaft and a non-rotating sensor mounted adjacent said magnet, wherein said system is connected to said shaft opposite said hub cap where said shaft is connected to an air supply; and
    at least one rotary seal located about said shaft.

15. A method of utilizing a steering axle, comprising:
    providing a steerable spindle having a hollow interior portion and a rotatable hub cap adjacent said spindle;
    locating a shaft within said interior portion of said spindle;
    connecting a first portion of said shaft to said hub cap for rotation therewith; and
    sensing the rotational speed of said shaft by locating a system comprised of a magnet on a second portion of said shaft within said spindle for rotation therewith adjacent a non-rotatable wheel speed sensor, said system on said second portion of said shaft also being connected to an air supply.

16. The method of claim 15, wherein at least two bearings position said shaft so that said magnet thereon rotates adjacent said sensor.

17. The method of claim 15, wherein at least one rotary seal is sealingly engaged with said shaft, said seal permitting rotation of said shaft.

18. The method of claim 15, wherein air travels through a back cover, through a hollow portion of said shaft to at least one tire air feed.

19. The method of claim 15, wherein a source of air continually pressurizes said shaft or intermittently pressurizes said shaft.

* * * * *